Aug. 20, 1929.                H. C. MOHR                1,725,470
                           TRAP CONSTRUCTION
                          Filed Oct. 15, 1928
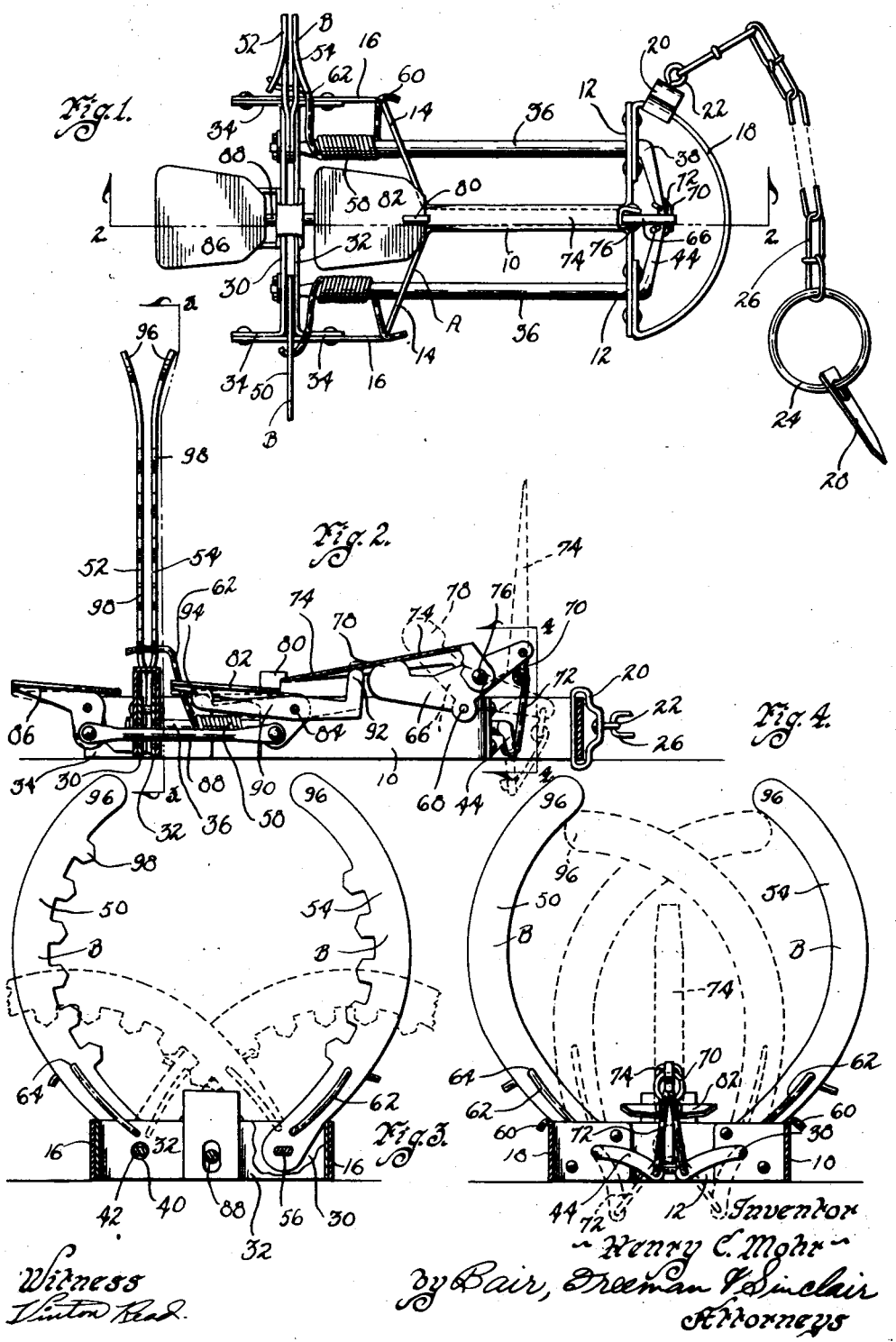

Patented Aug. 20, 1929.

1,725,470

UNITED STATES PATENT OFFICE.

HENRY C. MOHR, OF VICTOR, IOWA.

TRAP CONSTRUCTION.

Application filed October 15, 1928. Serial No. 312,551.

The object of this invention is to provide a trap construction of simple, durable, and comparatively inexpensive construction.

A further object of my invention is to provide such a trap structure which is adapted to catch an animal either around his neck or his body so that he cannot get loose therefrom. It may here be mentioned that the traps now in general use catch the animal by his leg and in order to get loose he will chew his leg off and thus the animal is lost. Even when the animal does not get loose, his fur is somewhat ruined in trying to get loose.

More particularly, it is my object to provide a trap structure consisting of a frame with a pair of spaced jaw shafts journaled therein, arm-like jaws being secured to the shafts and being bowed away from each other, whereby when sprung to closed position they effectively engage the neck or body of an animal passing between them.

Still a further object is to provide a convenient way of setting the trap consisting of a setting lever pivoted to the frame, which is merely swung to a position where it may be engaged by a catch on a release pedal for holding the trap in set position.

Still a further object is to provide a second release pedal, the pedals being positioned one on each side of the pair of jaws so that the animal may release the setting lever by stepping on either pedal, whereupon the jaws which are spring actuated, will swing together for catching the animal.

With these and other objects in view my invention consists in the construction, arrangement and combination of the various parts of my device, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a plan view of my improved trap structure.

Figure 2 is a sectional view on the line 2—2 of Figure 1.

Figure 3 is a sectional view on the line 3—3 of Figure 2; and

Figure 4 is a sectional view on the line 4—4 of Figure 2.

On the accompanying drawings, I have used the reference character A to indicate generally, a frame construction. The frame A is preferably made of flat bar material and comprises a narrow portion 10 terminating in outwardly extending arms 12 at one end and outwardly extending arms 14 at the other end. The arms 14 are then bent and extend substantially parallel to the portion 10 as indicated at 16. A D-shaped bar 18 is secured to the arms 12 for rigidly holding them relative to each other and thus forming an end member for one end of the frame A.

A loop 20 is mounted on the member 18 and may be slid therealong. A swivel eye 22 is mounted in the loop 20 and a ring 24 is connected thereto by a chain 26. The ring 24 may be placed over a twig or a stick driven in the ground and has a spike 28 which may be driven in a stump or the like for the purpose of anchoring the trap to prevent an animal or the like caught therein from walking away with it.

The other end of the frame A consists of a pair of bars 30 and 32 having outwardly bent ends 34 which are secured to the portions 16 of the frame A. The bars 30 and 32 are slightly spaced from each other.

A pair of jaw shafts 36 are journaled in the frame A by extending through openings 38 formed in the member 18 and the portions 12 of the frame, through openings formed in the portions 14 of the frame and through openings 40 formed in the bars 30 and 32. The jaw shafts 36 are flattened as indicated at 42 where they extend through the frame members 30 and 32. The opposite ends of the jaw shafts 36 are provided with crank arms 44.

Between the members 30 and 32, I provide jaws B. One jaw B consists of a single member 50 and the other one consists of two members 52 and 54. Each jaw B is provided with an oblong opening 56 adapted to fit on the flattened portions of the jaw shafts 36. It will thus be seen that rotation of the jaw shafts 36 will be imparted to the jaws B and vice-versa. Each jaw shaft 36 has wound thereon, a coil spring 58 having ends 60 and 62. The ends 60 contact with the frame A and the ends 62 extend through openings 64 formed in the jaw B. The springs 58 are arranged to cause inward movement of the jaws B toward each other as shown in dotted lines in Figures 3 and 4 of the drawings. The springs 58 may be stronger or weaker as desired, and may be made of double coils instead of single ones.

The setting mechanism of my trap consists of a rock arm 66 pivoted relative to the frame A on a pin 68. One end of the rock arm 66 is provided with a ring 70 which operatively connects by means of links 72 to the crank arms 44 of the jaw shafts 36. A setting lever 74 is pivoted as indicated at 76 to the rock arm 66 and is made of channel construction to fit over and contact with a head 78 formed on the rock arm 66.

The setting lever 74 is adapted to be held in predetermined position when the trap is set by a catch 80 formed on a release pedal 82. The release pedal 82 is pivoted at 84 to the frame A and a second release pedal 86 is operatively connected thereto by means of a link 88. A bell crank lever 90 is also pivoted on the pin 84 and is provided with an end 92 adapted to be engaged by the setting lever 74 when the setting lever is moved to trap setting position. Such contact causes the head portion 94 of the lever 90 to raise the release pedal 82 and cause the catch 80 to engage the free end of the setting lever 74.

The jaw B consisting of the arms 52 and 54 is adapted to straddle the other jaw B consisting of the arm 50. The ends of the arms 52 and 54 are bent outwardly as indicated at 96 so as to insure the jaws closing in proper position. The jaws B may be provided with projections 98 if desired or they may be smooth, as illustrated in Figure 4 where it is desirable not to injure the fur of the animal caught.

My trap may be used for either small or large animals, being equally well adapted for the catching of mice or bears. It is merely a matter of changing the size and strength of materials in its construction when designing it for different sizes of animals.

When either of the release pedals 82 or 86 is pushed downwardly as indicated in dotted lines in Figure 2, the catch 80 disengages from the setting lever 74 and allows it to be pulled to the dotted line position because of the springs 58. The jaws will then be swung toward each other as indicated in dotted lines in Figures 3 and 4 of the drawings, those in Figure 4 indicating the approximate position when an animal is caught in the trap. Setting the trap is a very simple matter, the setting lever 74 giving sufficient leverage to easily set the trap by hand against the tension of the spring 58. The leverage of the setting lever 74 could be changed to fit the traps of various sizes so that greater leverage could be had in the larger traps for overcoming the strength of the heavier springs therein.

The trap may be set in the runway of the animals or immediately in front of their burrows. It may be covered with leaves or straw to conceal it and in general, may be used for the trapping of all animals.

It is especially desirable for fur trappers, since it effectively catches the animal in such a position that he cannot get away and his fur is not injured.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a trap structure, a frame, a pair of spaced jaw shafts journaled therein, arm-like jaws secured to said jaw shafts, spring means for moving said jaws toward each other, crank arms on said jaw shafts, a setting lever pivoted on said frame and operatively connected with said crank arms and a release pedal cooperating with said setting lever to maintain the same in set position, said setting lever being formed of two parts pivoted together.

2. In a trap structure, a frame, a pair of spaced jaw shafts journaled therein, arm-like jaws secured to said jaw shafts, spring means for moving said jaws toward each other, crank arms on said jaw shafts, a setting lever pivoted on said frame and operatively connected with said crank arms and a release pedal cooperating with said setting lever to maintain the same in set position, said release pedal being positioned on one side of said jaws and a second release pedal on the other side of said jaws, said pedals being operatively connected with each other.

3. In a trap structure, a frame, a pair of jaw shafts horizontally journaled therein, vertical arm like jaws secured to said shafts, crank arms on said shafts, setting means cooperating with said crank arms for rotating said jaw shafts and thereby opening said jaws and a release pedal located on each side of said jaws for engaging and retaining said setting means in trap opened position.

HENRY C. MOHR.